United States Patent
Tanner

(10) Patent No.: US 8,185,469 B2
(45) Date of Patent: *May 22, 2012

(54) COMPUTER-BASED METHOD FOR TEAMING RESEARCH ANALYSTS TO GENERATE IMPROVED SECURITIES INVESTMENT RECOMMENDATIONS

(75) Inventor: James Tanner, Boulder, CO (US)

(73) Assignee: Markit On Demand, Inc., Boulder, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/083,138

(22) Filed: Apr. 8, 2011

(65) Prior Publication Data

US 2011/0191261 A1    Aug. 4, 2011

Related U.S. Application Data

(62) Division of application No. 11/768,274, filed on Jun. 26, 2007, now Pat. No. 7,941,359.

(51) Int. Cl.
    *G06Q 40/00* (2012.01)
(52) U.S. Cl. ......................................................... 705/37
(58) Field of Classification Search ................ 705/35–45
    See application file for complete search history.

(56) References Cited

U.S. PATENT DOCUMENTS

| | | | |
|---|---|---|---|
| 5,502,637 A * | 3/1996 | Beaulieu et al. ............ | 705/36 R |
| 6,236,980 B1 | 5/2001 | Reese | |
| 6,249,770 B1 | 6/2001 | Erwin et al. | |
| 6,493,681 B1 | 12/2002 | Tertitski et al. | |
| 6,581,039 B2 | 6/2003 | Marpe et al. | |
| 6,681,211 B1 | 1/2004 | Gatto | |
| 6,876,955 B1 | 4/2005 | Fleming et al. | |
| 6,970,839 B2 | 11/2005 | Jakobsson | |
| 6,983,257 B2 | 1/2006 | Gatto | |

(Continued)

FOREIGN PATENT DOCUMENTS

JP    2000090150    *  3/2000

OTHER PUBLICATIONS

Financial Analyst Journal/Jan.-Feb. 1996 "Analyst Forecasting Errors and their Implications for Security Analysis: An Alternative Perspective".*

*Primary Examiner* — Richard C Weisberger
(74) *Attorney, Agent, or Firm* — Marsh Fischmann & Breyfogle LLP; Kent A. Lembke

(57) ABSTRACT

A computer-based method for combining investment recommendations of individual research providers such as stock analysts. The method includes providing a server running a research team management module. A list of individual research providers is displayed on a client node linked to the server network. A research team is generated based on user input including a number of the research providers. Team rules are assigned to the team defining an algorithm for processing recommendations from the members of the team. Recommendations for securities are retrieved for the research providers on the team, and team recommendations are generated by applying the team rules to the recommendations. Team recommendations are reported to the client node for guiding investments. Processing of the individual recommendations may include applying differing weights to the positive and negative recommendations and combining the weighted recommendations, with the weights being user-selected differentiating strengths of members of the research team.

21 Claims, 10 Drawing Sheets

U.S. PATENT DOCUMENTS

| | | |
|---|---|---|
| 7,028,006 B1 | 4/2006 | Marsden et al. |
| 7,149,716 B2 | 12/2006 | Gatto |
| 7,165,044 B1 | 1/2007 | Chaffee |
| 7,167,838 B1 | 1/2007 | Gatto |
| 7,171,384 B1 | 1/2007 | Fitzpatrick et al. |
| 7,194,434 B2 | 3/2007 | Piccioli |
| 7,216,299 B2 | 5/2007 | Knight |
| 7,231,419 B1 | 6/2007 | Gheorghe et al. |
| 7,263,502 B1 | 8/2007 | Ramaswami et al. |
| 7,941,359 B2 | 5/2011 | Tanner |
| 2005/0240456 A1 | 10/2005 | Ward et al. |
| 2006/0074785 A1 | 4/2006 | Festog et al. |
| 2006/0161472 A1 | 7/2006 | Weild, IV |
| 2006/0277124 A1 | 12/2006 | Gerrietts, II |
| 2007/0162365 A1 | 7/2007 | Weinreb |

\* cited by examiner

COMPUTER-BASED METHOD FOR TEAMING RESEARCH ANALYSTS TO GENERATE IMPROVED SECURITIES INVESTMENT RECOMMENDATIONS

CROSS-REFERENCE TO RELATED APPLICATIONS

This application is a divisional of U.S. patent application Ser. No. 11/768,274, filed Jun. 26, 2007, issued as U.S. Pat. No. 7,941,359, which is incorporated herein by reference in its entirety.

BACKGROUND OF THE INVENTION

1. Field of the Invention

The present invention relates, in general, to financial data analysis methods and systems, and, more particularly, to computer software, hardware, and computer-based methods for analyzing research data, including buy, sell, hold, and other recommendations for stocks, generated by security or stock analysts or computer generated to provide consumers of such research data techniques for aggregating the data to improve investing performance.

2. Relevant Background

There are hundreds of firms who have as their business to provide buy, hold, and sell recommendations on individual securities—"Opinionated Research". There are also many firms that help the potential customers of such research recommendation determine which providers are the best—"Performance Measurement Firms".

Securities or stock analysts or "research analysts" are one of the main resources for information on companies and the desirability of investing in the companies. Research analysts attempt to predict future events such as earnings well in advance of the time the earnings are announced and may use these predictions and other information such as long-term prospects to provide investment recommendations, sector rating, growth rate and price targets. The role of the security analyst is generally well-known and includes issuing earnings estimates for securities, other financial estimates concerning future economic events, recommendations on whether investors should buy, sell, or hold financial instruments, such as equity securities, and other predictions. Security analyst estimates provided in research reports may include, but are not limited to, quarterly and annual earnings estimates for companies whether or not they are traded on a public securities exchange.

While research reports provide large amounts of useful information, there are numerous challenges facing a consumer of the estimates and recommendations, such as a manager of a mutual fund or an individual investor. Analysts typically summarize their search reports with a brief recommendation on the action an investor should take regarding a particular investment or stock. The various research analysts, who may be individual analysts or firms, often will differ in their recommendation for a particular company and its stock. For example, one research analyst may provide a buy recommendation while another firm is providing a sell recommendation. Further, every firm may use its own rating system to provide its recommendations with one firm using a five-point scale of buy, outperform, neutral, underperform, or avoid while another uses a three-point scale of buy, hold, or sell. Yet another firm may use a similar number of recommendations but use differing labels for their recommendations such as a five-point scale of recommended list, trading buy, market outperformer, market perform, and market underperformer. It may be difficult to understand the meaning of these various recommendations and to compare recommendations from different research analysts. As a result, products have been developed to normalize or standardize the various recommendation scales to allow the recommendations to be compared and, in some cases combined, for review by consumers.

The quality of an analyst's recommendations may also vary significantly. Several services have been developed to determine the past performance of research analysts and to provide rankings of their performance relative to their peers. For example, ranking services exist that provide rankings of analysts based on their ability to predict earnings for companies. Other services provide rankings of analysts by analyzing their research reports to determine whether their recommendations such as buy, hold, and sell have been accurate within a particular stock sector. Most analysts have strengths and weaknesses such as being better suited at picking stocks to sell, at predicting earnings but not predicting larger economic trends, analyzing stock values for certain sized companies, analyzing technology or durable goods, or the like, and these strengths and weaknesses cause the analysts to provide more accurate data in particular investment environments and less accurate data in others. Currently, the "performance measurement" companies are focused on picking the "best" research providers for their needs. They do not give the research buyer a way to explore the possibility of research provider combinations. Currently the "research aggregators" have taken in different research providers' data. The aggregators generally analyze the analyst performance and/or the research provider's performance. Aggregators use analyst's estimates accuracy and the performance of their ratings history accuracy to identify the top performing analysts and research providers.

The research aggregators are focused on the best analyst at estimates or ratings accuracy for a stock, sector or geography or the research provider and their performance. This is an isolated way of looking at research and is not necessarily the best way to research securities, nor does this satisfy the needs of the head of research or the research analyst. The research analyst purchases a "mosaic" of research or inputs to their investment process and it would be valuable to look at the combinations of data in order to identify top performing "research teams". No aggregator looks at the performance of combinations of research providers or creates virtual or synthetic research teams, using a combination of research providers to form a team based on a series of rules that the analyst sets.

There are nearly two hundred research firms that provide research on stocks within the United States alone, and at any one time, nearly one hundred of these analysts may be following a particular company's stock. As a result, it is very difficult to select among the numerous analysts to determine whose recommendations to follow at any particular time and for any particular stock, sector or market. In an attempt to address this problem, a number of services collect recommendations from a large portion of the analyst firms. Some services combine the recommendations of the analysts such as in a chart that displays the average recommendation of all the recommendations for a particular stock. This is often called the "consensus" recommendation, but it is actually a relatively naïve average that places an equal weight on all analysts regardless of their past performance or industry rankings. Also, the average recommendation of all analysts is often not a unanimous consensus because a buy or positive recommendation often will include a number of sell or negative recommendations (and vice versa for a sell recommendation). Some performance measurement firms, like Starmine, create a more sophisticated average estimate and recommendation by giving contributing analysts with a better track record, more weight than contributing analysts with a worse track record. Even so, these existing tools are focused on allowing the research consumer to find the best research analysts for a particular stock, or to create a stock-by-stock consensus, but they do not help the research consumer find combinations of providers that would outperform the individual providers.

With the above issues in mind, it may be useful to further explain the use of much of the securities research data by those in the financial industry. Asset and money managers such as traditional equity managers (e.g., long-only investors), pension funds, hedge funds, banks, and individual investors are generally considered "buy-side" consumers of research reports produced by research analysts. They purchase investment research in order to make informed investment decisions including buy, sell, and hold decisions on new and existing investments in stocks of companies. Investment research includes qualitative and quantitative data from independent research analysts or from affiliated research analysts (e.g., "sell-side" analysts with relationships with the firm or company they are analyzing). As noted above, investment research firms often have specialties such as a particular geographic coverage, market capitalization, market sector, or the like.

SUMMARY OF THE INVENTION

To address the above and other problems, the present invention provides methods and systems for creating combinations of research providers, or "teams". The invention allows the research consumer to explore different combinations of providers and analyze how those combinations performed relative to the providers themselves or other teams. The system and method involve electing a team of research providers or analysts from a set of such providers and then testing or validating the selected team using historical market and financial data to determine their performance when their recommendations are aggregated according to user-selected weighting and recommendation aggregation rules. The system and method then utilize the research team as a virtual analyst to provide investment recommendations for a user-selected set of securities in an ongoing manner.

There are many benefits to the investment community behind the research team approach. This analysis can be done without the research consumer seeing the actual recommendations of the research providers, which means the research and the proprietary data of the research provider is protected. This also means that the consumer of research can analyze the research provider's performance and their team performance before purchasing the underlying research from the provider. There is no other system in the market that has a team-based approach to ratings history and performance. Our system is further innovative in that you don't need to purchase the content/research to view the rating history and performance. There is no system that looks at the performance of combinations of research providers or creates a virtual or synthetic research provider and tracks its historical performance and treats the virtual or synthetic research provider as a single entity.

Other customer benefits of the research team approach include a demonstrable alpha generation when using a research team approach to research selection and research purchase. The customer has documented proof of the capability of their research methodology and information sources. This is significant for the customer in helping to satisfy the regulatory requirements of both the FSA and the SEC in justifying their spending on investment research. The research team system helps provide the quantitative basis behind a given research spend.

Further, the customer can track the performance of the team as easily as tracking the changes of one provider. Changes to estimates, target price, and ratings are tracked on a team basis, rather than simply looking at an individual analyst or provider or stock. By tracking the team, rather than simply individual providers, the analyst monitors one virtual team or synthetic team, rather than a handful of individual providers. This simplifies the amount of information the analyst has to digest to inform their investment opinion.

The concept of utilizing a team of research providers rather than a single provider comes from the inventor's realization that teams often perform better than individuals in making decisions similar to stock recommendations and also because individuals often have weaknesses and strengths that can compliment each other when the team members are selected correctly. For example, one team member may be accurate on buy recommendations while another team member may be accurate on sell recommendations, and weighting and team aggregation rules (e.g., typically not a simple averaging although average weighting may be used in some cases) are used to properly combine the members' recommendations to generate an aggregated or combined recommendation that is more accurate over time and in differing investment environments than either individual. In the methods and system of the invention, a team member's recommendations related to their strengths are generally weighted more heavily than their weaknesses such as weighing their positive or negative recommendations more heavily.

More particularly, a computer-based method is provided for processing and combining investment recommendations of individual research providers (e.g., stock analysts, quantitative models that generate recommendations, and the like) to achieve improved investment performance. The method includes providing a server or computer device that runs a research team management module and that is communicatively linked to a network such as the Internet. A list of individual research providers or identifiers of such providers is provided or displayed on a client node that is linked to the network. The research team management module then may generate a research team that includes two or more of the research providers, and the team members typically are chosen by a user of the client node by entering selections in a user interface such as a web page or screen. The method further includes assigning team rules to the research team to define an algorithm or method of processing recommendations from the research providers or team members on the research team. Then recommendations for one or more securities are accessed or retrieved for the research providers on the team and a team recommendation is generated by applying the team rules to the retrieved recommendations. The team recommendation is reported to the client node to assist a user in making investment decisions.

There are several variables and inputs to creating a team including selecting research team members and requiring the provider to have an opinion in order to be included in the team rating. Another variable or input may include the designation of the rule used to calculate the recommendation and recommendation history; this may include but is not limited to average, majority, consensus, unanimous to buy and one to sell, unanimous to sell and one to buy and unanimous to buy and one to sell but not short. Additional conditions or rules applied to the team include the number of team members who must provide a rating and weightings on attributes such as over weighting a team member's positive or negative ratings.

As a function of the rule and weights a user selects, they will impact and change the research team history and performance.

The algorithm for processing the individual recommendations may include first applying weights to each of the recommendations and then combining or "averaging" the weighted recommendations, with the weights being user-selected to differentiate the strengths of each member of the research team (e.g., by applying differing weights on positive and negative recommendations for an individual provider or differing weights on the various team members). The team rules may also include other aggregation methods such as determining if more than half of the team members have recommended a buy/positive or a sell/negative recommendation and if so, using this majority recommendation as the team recommendation. In some cases, the team rules will call for all to agree to generate a positive or a buy recommendation and allow one team member to cause the team to generate a negative or sell recommendation (e.g., unanimous to buy and one to sell). The method also calls for running a performance analytics module on the server to determine historic performance for recommending securities of the set of research providers and delivering at least a portion of this to the client node for use in selecting team members. The selection of one or more of the team members may be automated or partially automatic as a user can request high-end performers in a particular performance category (e.g., as determined by a particular performance analysis methodology). The method may further include determining the historic performance of the formed research team by accessing actual prior recommendations of the team members over a particular time period for a select or default set of stocks or securities. This historical team performance can then be reported to the client node along with historic performance data for the individual team members, and a user can then determine if the team members perform better together or apart and adjust the team rules/members as appropriate (e.g., an iterative process may be used to enhance the team results). In addition to such team validation or testing, the research team may be used to track a set of securities going forward and alerts may be generated when one or more of the recommendations of the team members is changed causing the team recommendation for a stock or security to also change.

DETAILED DESCRIPTION OF THE PREFERRED EMBODIMENTS

Figure 1:
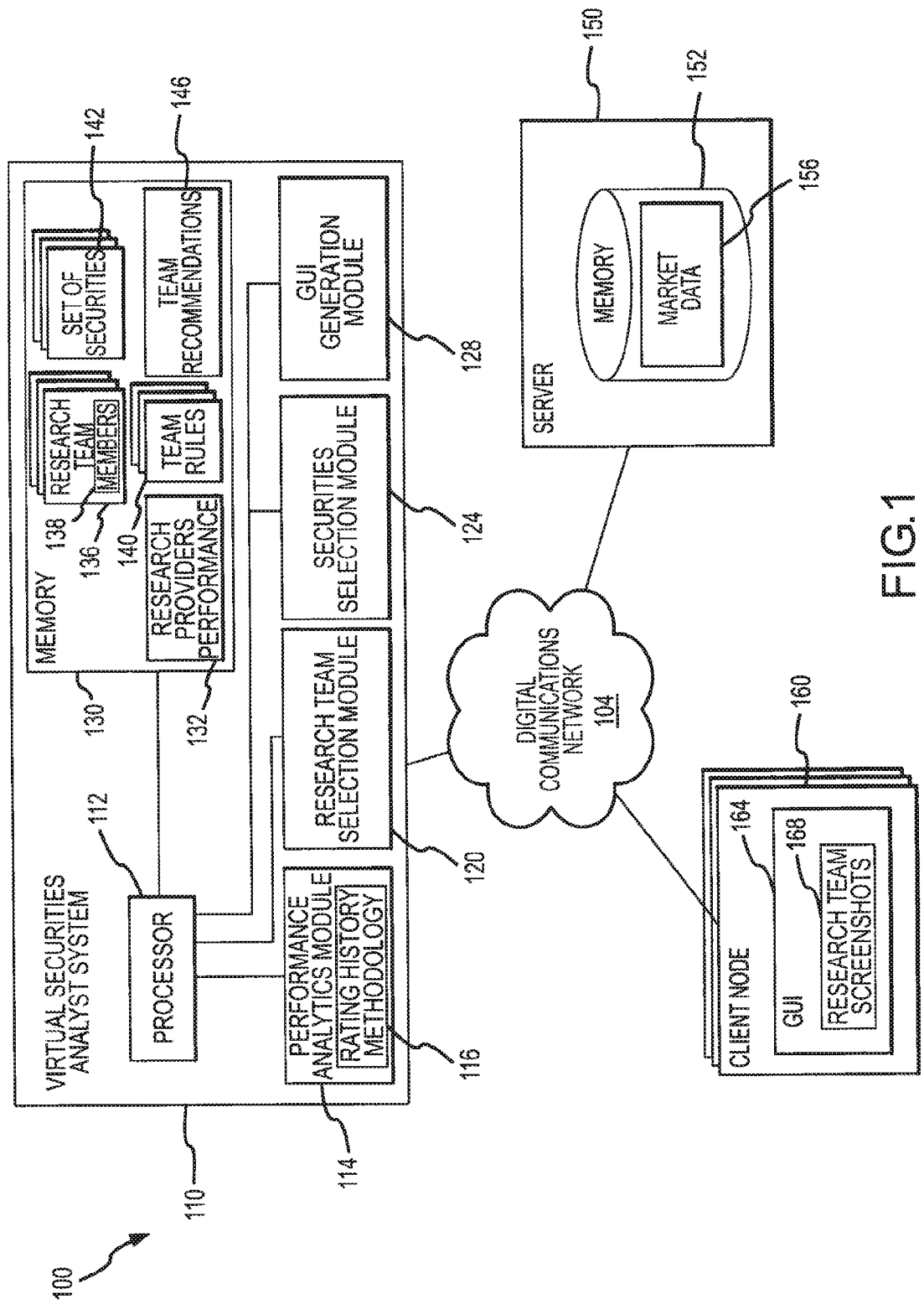
FIG. 1 is a functional block diagram of a computer system or network according to an embodiment of the invention showing use of a virtual securities analyst system, e.g., a server or other computing device to implement software modules or programs and stored digital data to perform the research data analysis functions of the invention.

The present invention is directed to methods and systems for generating and utilizing a research team from a set of securities research providers or analysts to provide a team recommendation for securities such as stocks on a watch or coverage list. In practice, a buy-side analyst such as money or asset manager uses the tools provided by the invention as a "team manager" to help them identify combinations of research providers that perform better as a team than as individuals. Without the tools provided by the invention including the team testing or validation module or process, it would be nearly impossible to select and test such a research team, e.g., an analytics engine in some embodiments may perform 3.6 million data points (calculations) in a minute in order to generate performance ratings or results for individual research providers and for formed research teams. Once a research team is formed, the systems of the invention can track changes in recommendations provided by a research team (e.g., the recommendations of a virtual securities analyst) as easily as tracking changes in recommendations of an individual research provider. While averaging of recommendations may be useful in some applications, custom rules, such as favoring one analyst's or researcher's recommendations for buys over other team members and favoring another analyst's sells, allows the user or customer of the embodiments of the invention to leverage each team member's strengths within the research team and generate an alpha in its stock or securities investments, i.e., an amount of performance that exceeds a particular benchmark that may be determined on a risk-adjusted basis.

The functions and features of the invention are described as being performed, in some cases, by "modules" that may be implemented as software running on a computing device and/or hardware. For example, the research team selection, testing, and use processes or functions described herein may be performed by one or more processors or CPUs running software modules or programs such as an analytics engine to generate provider performance, a team creation engine to allow a user to select and test a research team, a rules manager, and the like. The methods or processes performed by each module is described in detail below typically with reference to flow charts or data/system flow diagrams that highlight the steps that may be performed by subroutines or algorithms when a computer or computing device runs code or programs to implement the functionality of embodiments of the invention. Further, to practice the invention, the computer, network, and data storage devices and systems may be any devices useful for providing the described functions, including well-known data processing and storage and communication devices and systems such as computer devices or nodes typically used in computer systems or networks with processing, memory, and input/output components, and server devices configured to generate and transmit digital data over a communications network. Data typically is communicated in a wired or wireless manner over digital communications networks such as the Internet, intranets, or the like (which may be represented in some figures simply as connecting lines and/or arrows representing data flow over such networks or more directly between two or more devices or modules) such as in digital format following standard communication and transfer protocols such as TCP/IP protocols.

Figure 8:
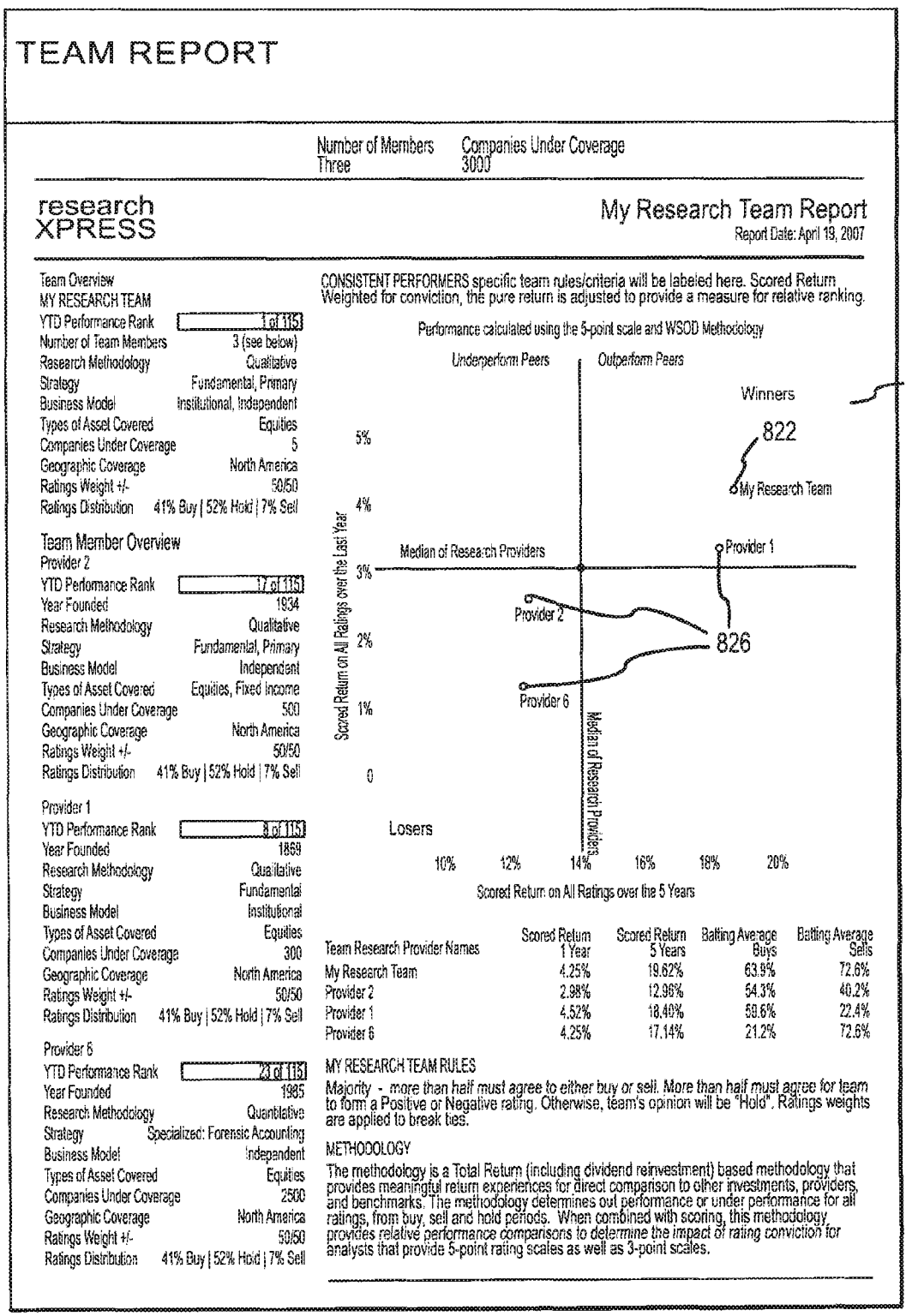
FIG. 8 is a graph with explanatory text showing a report of an exemplary research team with the performance chart comparing performance of the research team relative to its three component research providers considered individually.
Figure 9:
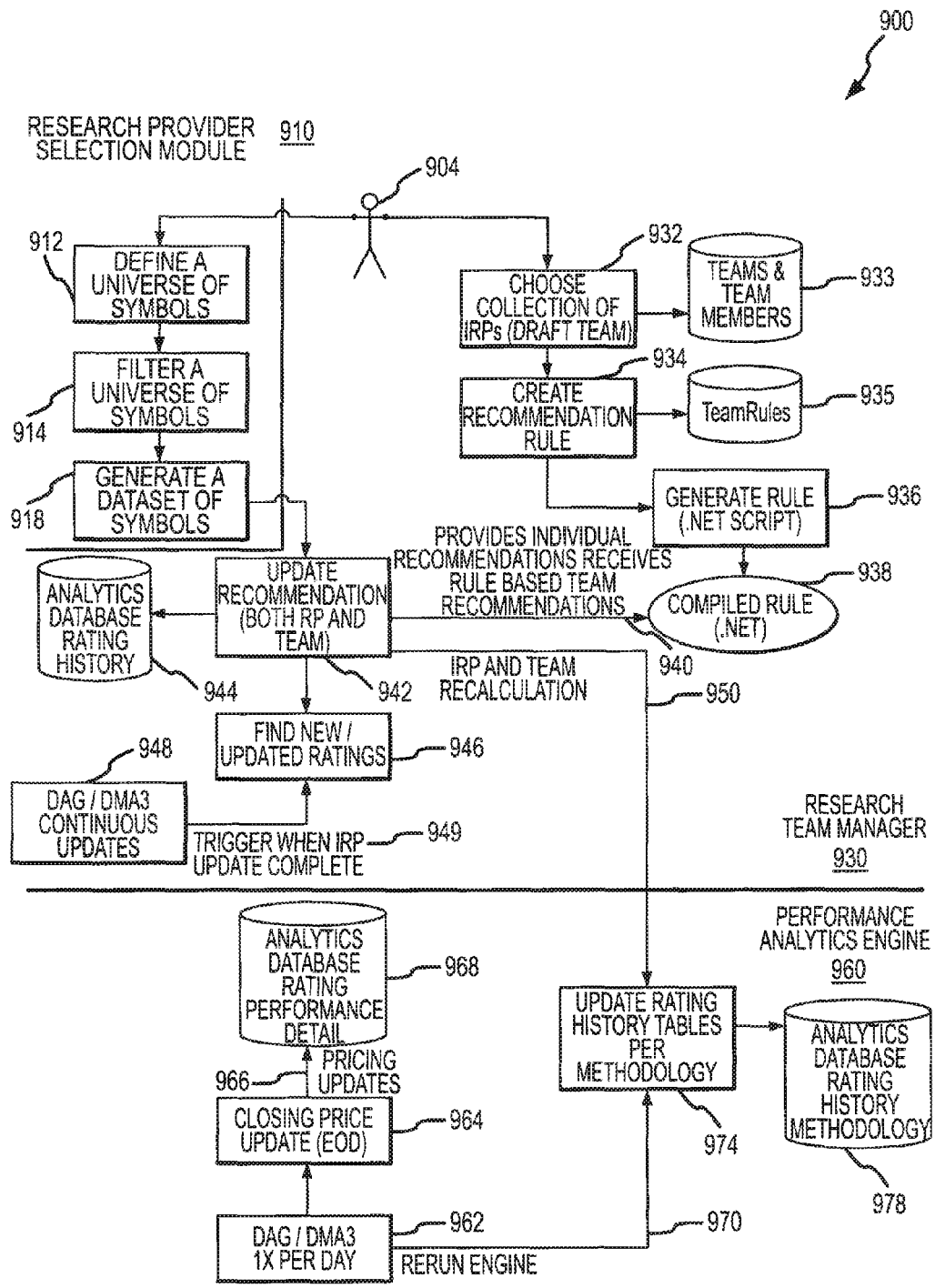
FIG. 9 is a data flow diagram illustrating components of a system or computer network of the invention (such as but not limited to the system of FIG. 1) showing data flow and functions of the system during its operation during initial team selection and validation and also during use of the team to obtain ongoing recommendations.
Figure 10:
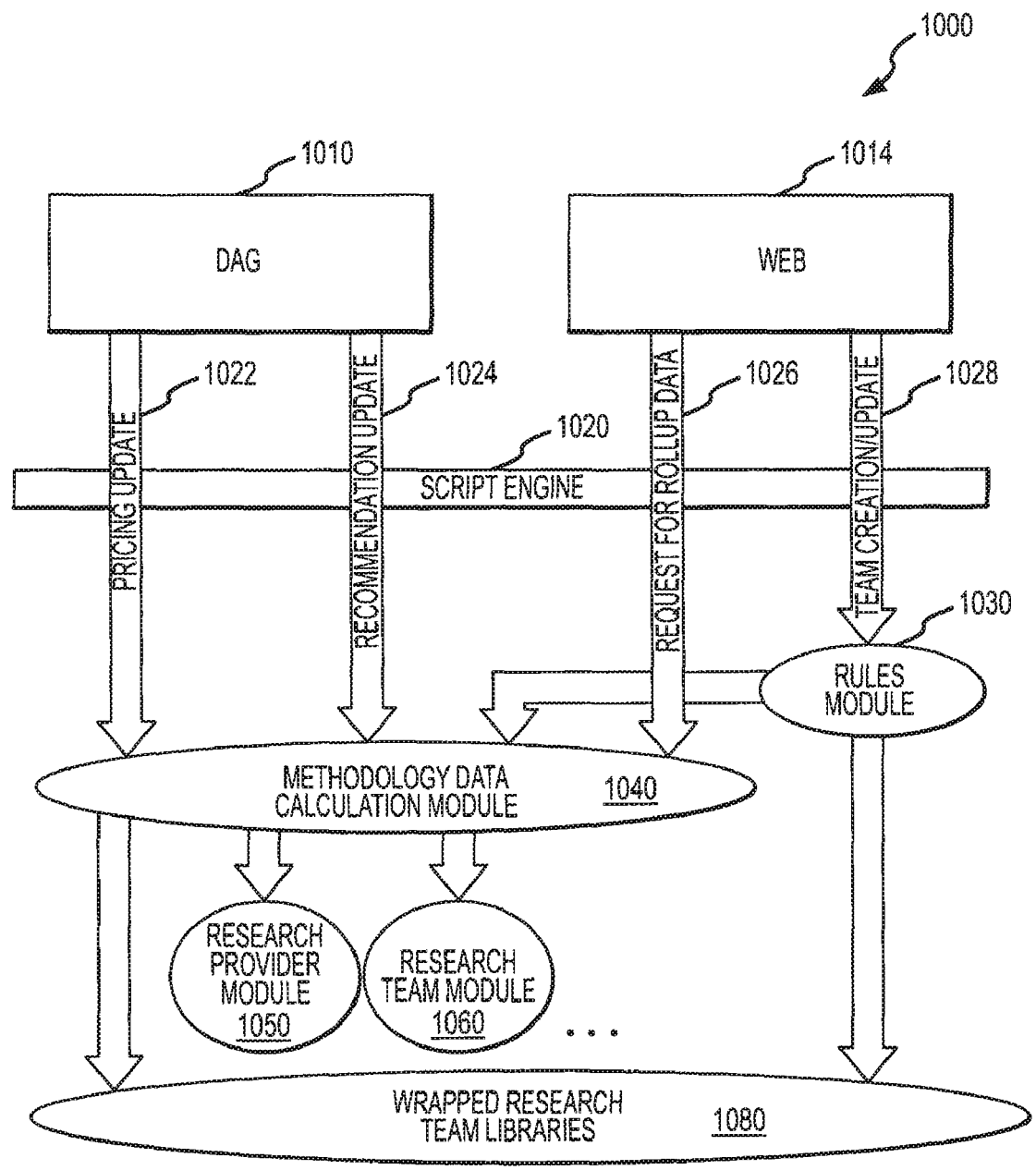
FIG. 10 is a system flow diagram similar to that of FIG. 9 showing data flow and functions of a system according to the invention during team selection, team testing, and ongoing recommendation operations.

The following description begins with a description of one useful embodiment of a computer system or network 100 with reference to FIG. 1 that can be used to implement the research team generation, validation, and use processes of the invention. Representative processes are then discussed in more detail with reference to the method 200 of FIG. 2 with support or more detail provided by the screen shots of a user interface or pages shown in FIGS. 3-6 that may be generated during operation of the system 100 of FIG. 1 or another system according to the invention. The description then proceeds to explain the advantages provided by use of a research team created according to the invention to make investment decisions with reference to the graphs and reports of FIGS. 7 and 8. FIGS. 9 and 10 provide system and data flow diagrams 900 and 1000 that provide further explanation of the workings of representative systems of the invention including their software modules run on typical servers or other computer devices, e.g., a web server accessible via the Internet or other wired or wireless digital communications network.

FIG. 1 illustrates a simplified schematic diagram of an exemplary computer system or network 100 and its major components (e.g., computer hardware and software devices and memory devices) that can be used to implement an embodiment of the present invention. As shown, the system 100 includes a virtual securities analyst system 110 that may comprise a server such as a web server or the like that is connected to a digital communications network 104 such as the Internet, an Intranet, or the like. Such an arrangement allows client nodes 160 that run web browsers or similar applications to use a user interface or graphical user interface (GUI) 164 to access and interact with the analyst system 110. As shown in FIG. 3-6, a user or operator of the nodes 160 may be provided one or more research team screenshots 168 generated by the system 110 to review performance data on analysts, to select a research team from these analysts, to select a set of stocks or other securities to watch or cover, to obtain recommendations on these stocks from the "virtual" analyst via the recommendations of the team that are combined based on weightings and aggregation rules, and/or to otherwise provide user input and receive output such as the reports shown in FIGS. 7 and 8. The connection to the network 104 also allows the analyst system 110 to access server 150 that has memory 152 storing market data 156 such as stock prices and other data from financial markets such as stock exchanges and services that track securities.

The analyst system 110 includes a processor or CPU 112 that runs a set of software modules (that may be implemented partially or fully with hardware in some cases) to provide its functionality. Specifically, the processor 112 runs a performance analytics module 114 that provides among other functions the ability to analyze the performance of a plurality of research providers or analysts that provide recommendations on securities (e.g., buy, sell, hold, and other recommendations on stocks or other securities). The module 114 may determine such performance and rate each analyst or provider in relation to their peers using a rating methodology or historical performance technique. The invention is not limited to a particular performance analysis technique or methodology 116 with the more important aspect being that a user of the client node 160 is able to see ratings of the providers or analysts such as on a screenshot 168 of GUI 164, in some cases select the methodologies to use to analyze the performance, and to select from the analysts for their research team using the ratings or performance results provided by the analytics module 114. Further, these same or differing methodologies 116 may be used to test a formed research team to determine if the team is able to beat or out-perform individual team members and/or market benchmarks. The studies 116 may be those presently known by those skilled in the financial analysis fields or ones later developed, and in one embodiment, the analytics for determining a research provider's performance include: consistently outperforming peers, better at buys than sells, batting average, comparing conviction of rating with return, independent research versus investment bank research, size of research coverage universe versus returns, and comparing type of analysis, philosophy, or research methodology. These methodologies are explained in more detail with reference to FIGS. 2-6, but, again, other methodologies (e.g., performance measurements accepted by the financial industry to identify "best" performing analysts including qualitative measurements, momentum performance measurements, short stock pickers, and the like) may be include in rating methodologies 116 to determine historical performance of an analyst in a variety of financial environments and based on varying benchmarks. Memory 130 is provided in the system 110 and is used to store the research providers' performance 132 determined by the module 114 (e.g., ratings of each research analyst in an available set of analysts based on, for example, their ability to accurately pick stocks to buy or stocks to sell).

The performance data 132 may also include an identifier or listing for each research provider for who research information including investment recommendations is available. A research team selection module 120 is also run by the processor 112 to enable a user of client node 160 to form teams 136 that are stored in memory 130 and that include two or more of these research providers indicated in performance data 132 or elsewhere in memory 130 (or accessible by processor 112). Selection of a research team 136 via module 120 is an important aspect of the invention as it allows a user to select, such as via GUI 164, two or more research providers or analysts to be members 138 of their team or teams 136, and these members 138 act to provide a set of investment recommendations that are combined to form team recommendations 146 that are also stored in memory 130. The recommendations of the individual members 138 of each team 136 are combined to form team (or virtual securities analyst) recommendations 146 using team rules 140, which typically include weights to be applied to each analyst's recommendations and aggregation rules for determining how to combine the recommendations (as is explained in more detail with reference to FIG. 6). The team rules 140 preferably are selected or adjusted based on input from a user of the client node 160 but also may be set to default values.

The system 110 further includes a securities selection module 124 that allows a user such as a money/asset manager or independent investor to choose a set of securities or stocks 142 that is stored in memory 130. Then, the system 110 may operate to determine the recommendations 146 of the team (or teams) 136 for this set of securities 142 (e.g., stocks in a mutual fund, stocks being considered for addition or deletion from a portfolio or fund, or the like) and to watch for changes to such recommendations 146 (at which point an alert may be sent to the client node 160 via GUI 164 or via other messaging techniques such as e-mails, text messaging, voice messaging, or the like). In some cases, the set of securities 142 and a particular time period is selected by a user of node 160 prior to determining the research providers' performance 132 by the analytics module 114, and this allows a user to determine the performance of the analysts and potential team members based on particular stocks such as stocks in a particular industry, stocks for companies involved in a particular technology or having a particular geographic coverage, or other distinguishing characteristics.

As will become clear, the research team 136 may also be tested or validated by determining their performance for all covered securities by operating the analytics module 114 or for just the set of securities 142 of interest to a user. If a team 136 does not perform well (e.g., outperform a particular benchmark or better than its members' individual recommendations), the user can provide input to the system 110 via the GUI 164 to modify the team 136 or to create a new team 136 with differing members 138, which can be tested or validated based on a test using historical performance data (e.g., based on past recommendations of the team members 138, combining those recommendations into team recommendations 146, and determining a resulting performance relative to some particular benchmark such as market indexes, individual analysts, or the like). A GUI generation module 128 is also included in the system 110 and run by the processor 112 to generate the GUI 164 and its screen shots or displays 168 and to provide data from, memory 130 or other sources to the node 160.

From the description of the system 100, it will be understood that one of the aspects of the invention is to allow an asset or money manager or other user/operator accessing the system 110 to find the best or an useful combination of research providers or analysts that perform better as a team than as individuals and that even, in some cases, outperform in the "star" or higher-performing individual research providers or analysts. Such teams 136 have a set of team rules 140 that may be default rules or be selected by the user/operator of node 160 to cause each of the team members 138 to contribute in a desirable manner, e.g., by having each member play to their strengths as indicated by historic performance measurements and/or ratings against their peers. With application of the team rules 140, the teams 136 can be thought to act somewhat like a committee (or single, virtual security analyst) with each committee or team member 138 providing one vote as to what the team recommendation 146 should be for a particular security.

In one embodiment, the team selection module 120 is useful when combined with the performance analytics module 114 because a user or operator of the client node 160 can be allowed to model or form a team 136 and test or validate it based on historic recommendations and the resulting team performance but without actually having access to the individual recommendations of the team members on any one stock or security. For example, an asset manager or other user generally operates with a fixed or limited budget for purchasing research from analysts, and they are forced to select a limited number of research providers and pay subscription or other fees for those analysts' information and recommendations. With the present invention, the asset manager can operate the client node 160 before making the purchase decision to model one or more teams 136 and determine their performance on a default set of securities or a set of securities 142 selected by the asset manager using historic market data 156 and prior recommendations regarding those securities by the team members 138 via operation of the analytics module 114 by processor 112. The use of the processor 112 to run the analytics module or engine 114 allows millions of recommendations over selected time periods (e.g., buy and sell recommendations, upgrades, downgrades, and the like) for thousands of securities (e.g., there are over 5,000 stocks available on the exchanges in the United States) to be processed according to the methodologies 116 to determine prior performance of individuals and of a hypothetical or proposed team 136, which would be impractical and nearly impossible without a fairly robust computing device or system.

After the asset manager identifies a useful team 136, the asset manager may decide to use their budget to purchase rights to the research of the analysts on the team 136 and begin to obtain team recommendations 146 for present investment decisions (i.e., based on current recommendations of the team). Note, the team rules 140 are used to form the "useful" or outperforming team 136 and would typically be used to process current individual recommendations to obtain current team recommendations 146 (although this is not required and the team rules 140 may be altered over time to try to enhance the team recommendations 146 and performance achieved using such recommendations 146). The securities selection module 124 may be used to help a user of node 160 to select a set of securities 142, as discussed above, and, in some embodiments, it is also adapted to use the team 136 as part of a stock screener or screening tool to rate or provide recommendations on stocks input to the team or to retrieve stocks that the team recommends by processing the team recommendations 146 to obtain all positive recommendations. An alert service module may also be provided such as part of the GUI generation module 128 to monitor the team recommendations 146 on an ongoing or periodic basis and when an upgrade, downgrade, or other event occurs for one of the team members 138 to determine new team recommendations 146. When the recommendations 146 for the team 136 are effected, an alert such as an e-mail, a text message, a voice mail, or other alert may be communicated to a user of the node 160 or other consumer of such an alert service (e.g., alert delivered via node 160 and/or another communication device such a wireless communication device).

Figure 2:
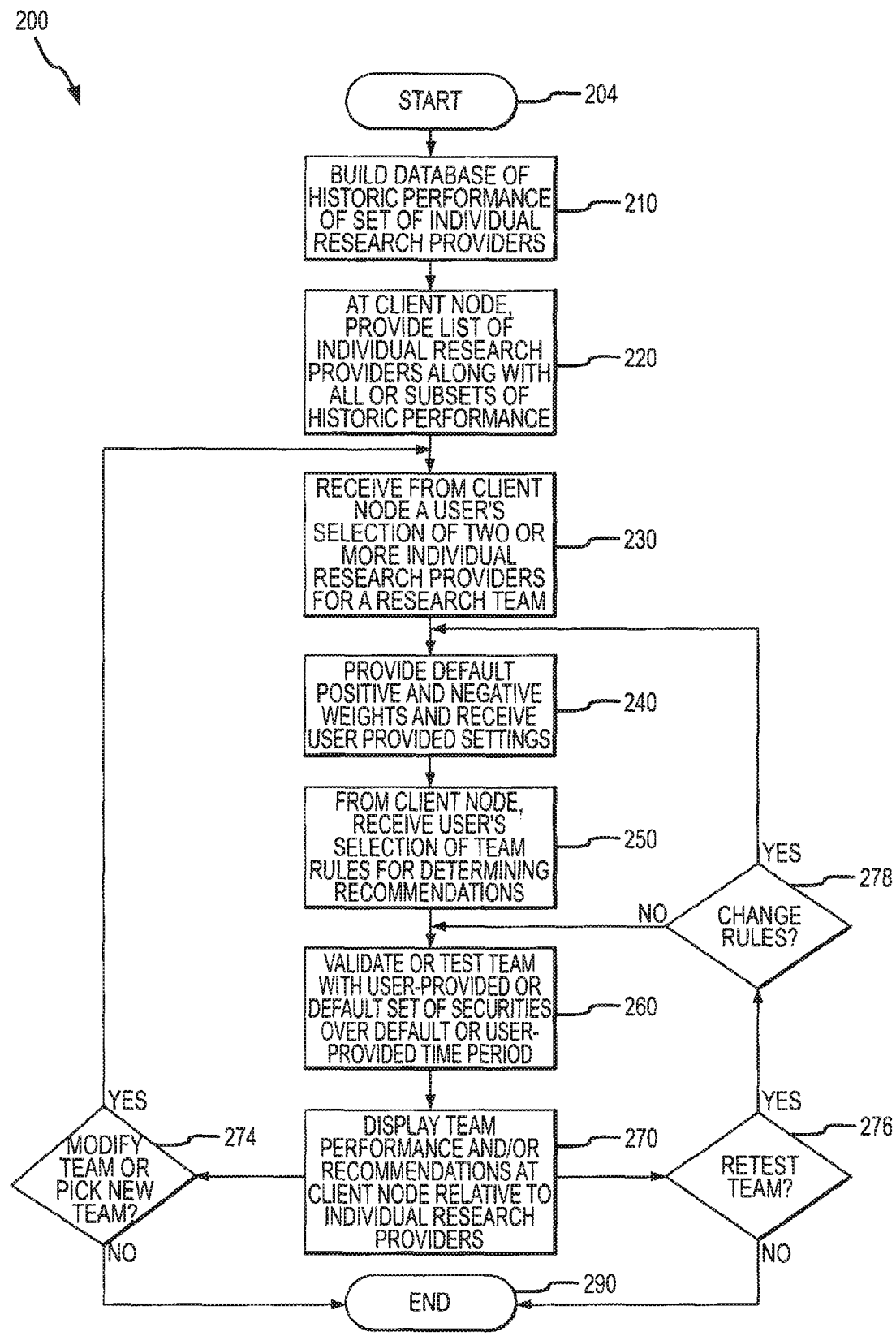
FIG. 2 is a flow diagram illustrating an embodiment of research team selection and operation according to an embodiment of the invention such as may be achieved during operation of the system of FIG. 1.

FIG. 2 illustrates an exemplary research team formation and use process 200 according to the invention, and the process 200 will be discussed with reference to FIG. 1 as it may be implemented by operation of the system 100 and with reference to FIGS. 3-8 which provide interfaces or pages and reports that may be generated as part of process 200 to enable user input and to provide output or products from the system 110 to a user of a client node 160. The process or method 200 starts at 204 such as with loading of the modules of an analyst system 110 on one or more computing devices and by providing access to market data 156 to the analyst system 110 to allow performance measurements to be calculated by the analytics module 114. At 204, client nodes 160 may also be provided access to the analyst system 110, e.g., to allow investors to select a research team 136. At 210, the method 200 continues with the building of a database of historic performance information for a set or number of individual research providers (e.g., those firms or individual analysts that can be chosen to be as members 138 of teams 136). In some embodiments, the performance measurements are determined based on one or more rating methodologies 116 while in some embodiments step 210 is not performed until performance measures are requested by a user such by making a query via a GUI 164 on a node 160.

Figure 6:
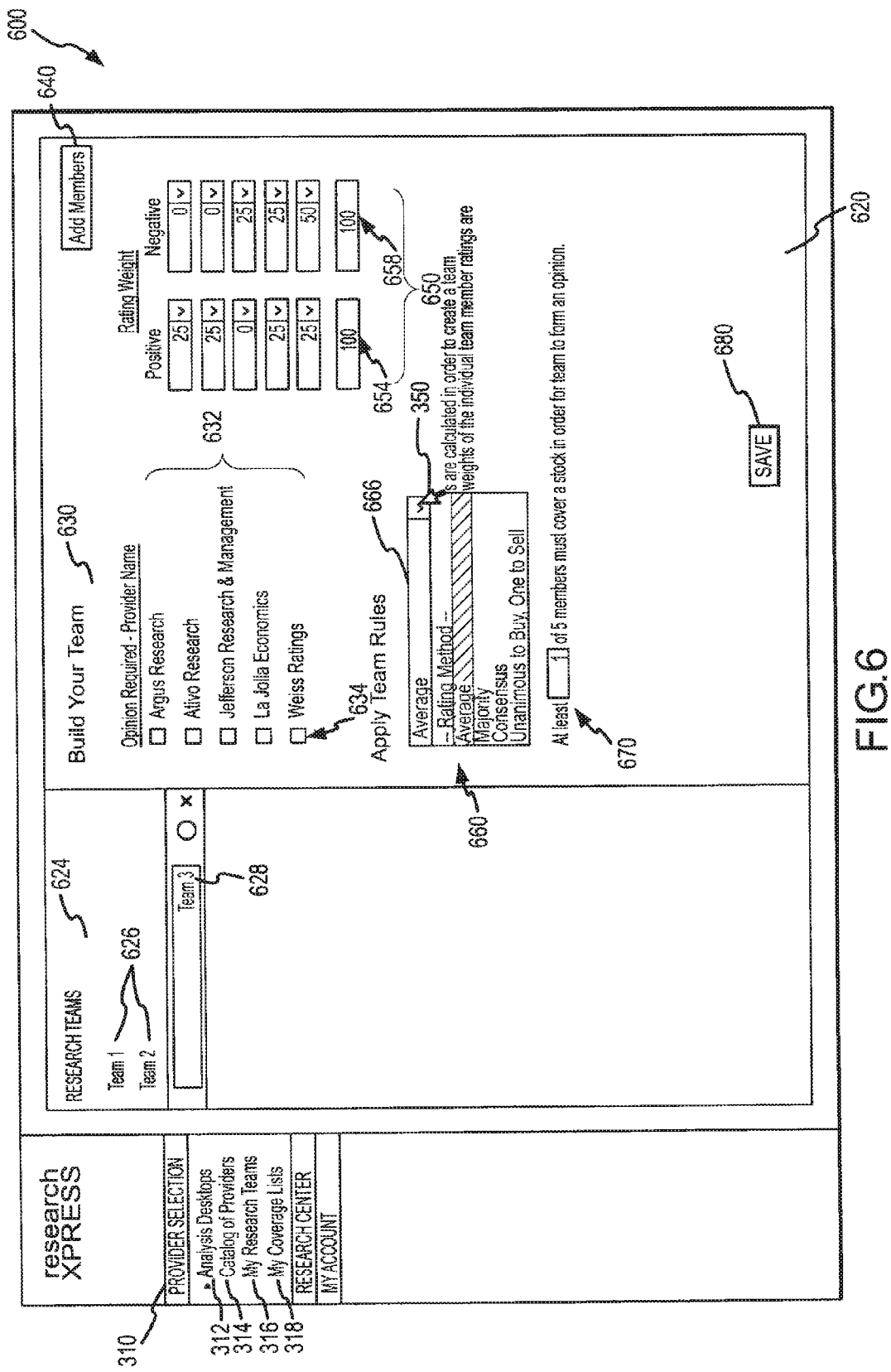
FIG. 6 illustrates a user interface or screen shot of a browser page of a GUI generated as part of an implementation of the invention showing an input window for allowing a user or consumer to provide input to select a research team from a group of independent research providers and to establish rating weights for each of their recommendations and to set team rules for making a team recommendation or to act as a virtual securities analyst providing an aggregated recommendation for a particular security.

With this in mind, the method 200 continues at 220 with the analyst system 100 functioning to provide at the client node 160 a list of individual research providers along with all or subsets of the historic performance for such providers. For example, the GUI generation module 128 may act to provide one or more research team screenshots 168 on GUI 164 in response to a user querying the system 110 for information on which stock analysts and/or research providers are available as team members 138 and for which performance measurements have been determined or can be readily determined by analytics module 114. For example, FIG. 6 illustrates a screenshot 600 of a representative page that may be displayed on the client node 160 through operation of the research team selection module 120 and the GUI generation module 128 (and, in some cases, a browser or similar application on client node 160). Page or screenshot 600 will be described in more detail below but for now it is useful to note that a build team window 630 is included that allows members to be listed and added, such as by selection of button 640 with a keyboard, mouse, or other input device and positioning of icon 350.

Figure 3:
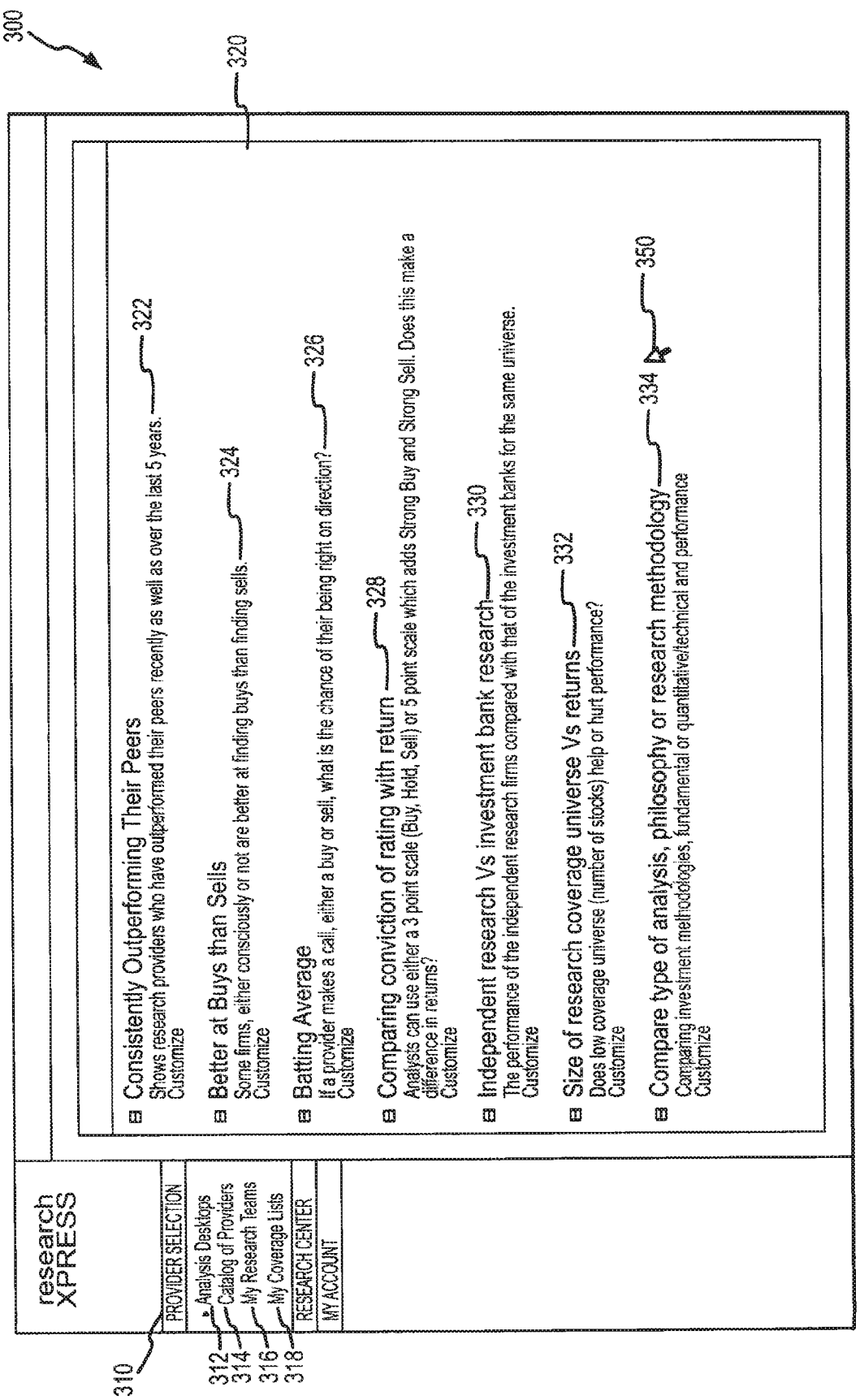
FIG. 3 is a user interface or screen shot of a browser page generated as part of implementing an embodiment of the invention, e.g., operation of GUI generation module and performance analytics module of FIG. 1, illustrating a user's or a consumer's ability to select among a number of performance analysis methodologies to rate independent research providers relative to their peers and/or market benchmarks.

To determine which analysts from the set of available analysts to include on a team 136, it is often useful to review their prior performance as determined at 210 to identify their strengths and weaknesses. As part of step 220, all or subsets of such performance measurements is provided or reported to a requesting user. FIG. 3 illustrates a screenshot or web page 300 that the system 110 may present to a user of a node 160 as part of performing step 220. In screen 300, the frame indicates that a user has chosen provider selection 310 and analysis or analytical tools 312 within this selection 310. The user can also choose, such as by positioning of icon 350 and input on a user input, to view the list of available individual research providers at 314, choose to view their previously formed research teams 136 at 316, and/or choose to view their set of securities or coverage lists at 318. With reference to step 220, the window 320 shows a list of performance measurements that the user can request for display in a subwindow of window 320 or in another page or screen shot (and, in some cases, nm by analytics module 114), and these measurements may correspond or build on the ratings methodologies 116.

As discussed, a variety of performance rating and evaluation methodologies 116 may be used to assist a user of client node 160 in selecting team members 138 for a team 136. Typically, a team will outperform its individual members considered separately with a proper set of team rules 140 but better teams are often achievable by selecting analysts or providers that are among the strongest in a particular category or are among the best with regard to a particular performance methodology. With this in mind, a user may view the window 320 and select one of the subsets of performance measurements or results of the listed methodology. These methodologies include an analyst that consistently outperforms their peers at 322, which generally involves the performance analytics engine 114 determining which research providers have outperformed their peers (or at least the peers in the available list of analysts at 314) for a particular period of time such as a recent period (e.g., last 3 to 6 months) or over a longer period of time (e.g., last 1 to 3 or more years). When 322 is selected, a listing, report, table, chart, or other report is typically transmitted from the system 110 to the requesting client node 160 for display at 168 on GUI 164 or for outputting as a hard or electronic copy.

Figure 4:
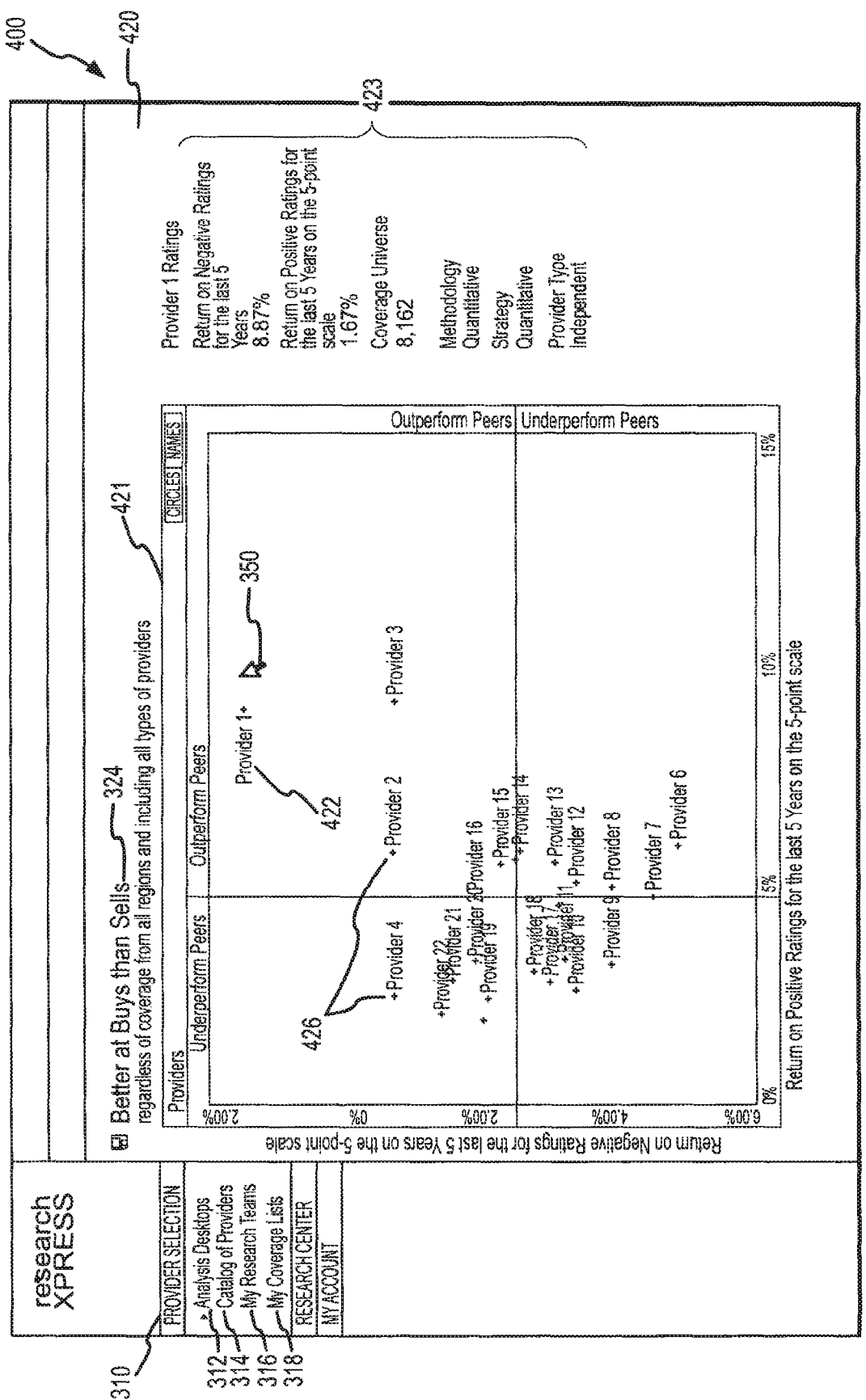
FIG. 4 illustrates a user interface or screen shot of a browser page generated as part of an implementation of the invention showing an exemplary performance chart for one performance analysis methodology or rating scheme for independent research providers that shows providers based on their ability to more accurately pick or recommend security buys rather than sells.

Another rating methodology is shown at 324 to be determining which analysts are better at buy or positive recommendations than at sell or negative recommendations. This is significant because many times rarely issue a truly negative recommendation due to conflicts of interest or other issues, and as a result, these firms or analysts are generally unable or are at least slow in predicting when a security should be sold but are still very competent at making buy recommendations for companies. FIG. 4 illustrates a page or screenshot 400 that may be provided to a requesting client node 160 to display such a performance measurement for the available independent research providers. Window 420 includes a results chart 421 that shows the performance of a number of research providers with a "best" provider or high performing analyst shown at 422 with other providers shown at 426. The ratings or placement of the providers 422, 426 is based in this case on return on positive ratings for the last 5 years on a 5-point scale (or normalization to such a scale) and also on return on negative ratings for the last 5 years on a similar 5-point scale (which typically will have two negative ratings below a neutral or hold rating or recommendation and two positive ratings or recommendations above a neutral or hold rating). As shown, the "Provider1" as shown at 422 outperforms his peers both in regard to return on positive ratings and in regard to return on negative ratings or recommendations. Other providers such as "Provider6" outperform their peers (or median) in regard to their positive ratings or recommendations while significantly underperforming their peers with regard to their negative ratings or recommendations. Section 423 of window 420 provides details or performance results for a selected provider from the chart 421 (i.e., for "Provided" in this example). The information can be requested by a user of the system 110 for use in selecting one or more team members 138 for their teams 136 and for deciding what weights to apply to the votes or recommendations of such team members 138 and how best to combine the recommendations into an aggregate or combined team recommendation 146. For example, Provider6 who is shown to be good at providing positive recommendations but not negative recommendations may be weighted more for buys than for sells while Provider1 who is shown to excel at making both recommendations may be equally weighted or have a heavier weight than Provider6 for sells (and, optionally, for buys). As will become clear from further description of FIG. 6 and step 240 of method 200, each team member 138 of a team 136 is able to provide both positive and negative recommendations on any covered stock and a user can assign different weights for each team member 138 and for each type of recommendation (i.e., positive or negative or, in some cases, neutral).

Figure 5:
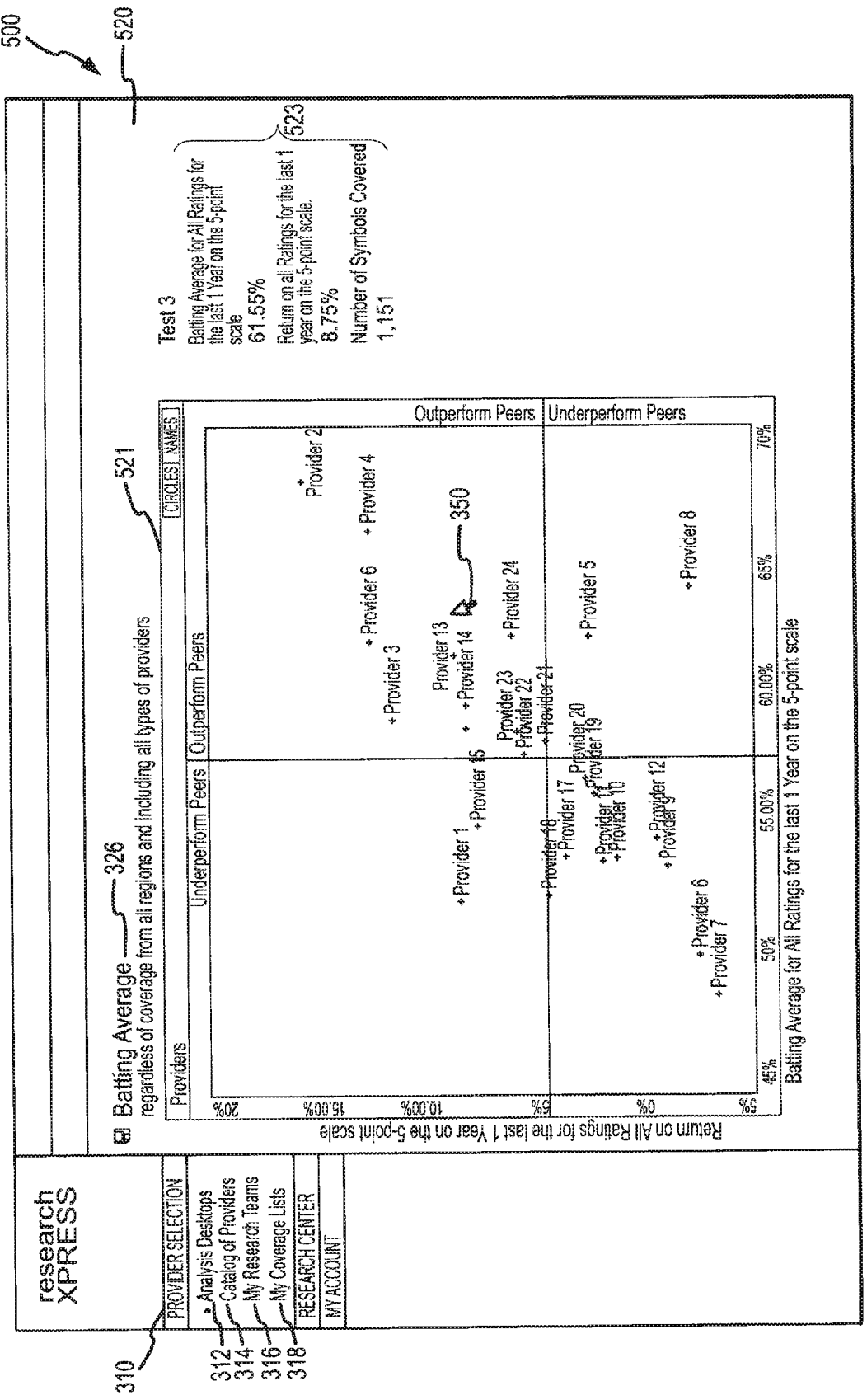
FIG. 5 is a user interface similar to that shown in FIG. 4 illustrating another performance chart for another performance analysis methodology or rating scheme for independent research providers that shows providers rated against their peers based on a batting average of their past recommendations.

Referring again to FIG. 3, another methodology 326 involves determining research providers' batting averages. These averages refer to the concept of a provider making a call (e.g., an upgrade to a buy or a downgrade to a sell or other positive or negative recommendations) and determining the percentage of the time that the call is in the right direction (e.g., if the call was a positive recommendation did the stock's price increase afterwards, if the call was a negative recommendation did the stock's price decrease afterwards, and the like). FIG. 5 illustrates a screen or page 500 that may be provided to a client node 160 when link 326 is chosen in screen 300 of FIG. 3. As shown, a window 520 is provided with a performance or results graph 521 that rates or shows the performance of a number of individual research providers or analysts with regard to their batting averages, as may be determined by analytics module 114 implementing the "batting average" methodology of performance evaluation. The chart 521 shows each provider's batting average along the X-axis with Provider2 and Provider 4 outperforming their peers and the median of all providers. The Y-axis of chart 521 is used to show the performance measurement of return achieved or achievable by an investor that followed all of the ratings or recommendations of the same research providers over the past year. For both axes, the number of stocks (or "symbols") tracked in the analysis was relatively large at over 1,150, which is indicative of the large volume of calculations that are performed by a performance analytics module 114 of embodiments of the invention to assist a user in selecting appropriate team members 138. As will be appreciated, it may be useful to have one or two team members 138 on a research team 136 that have high batting averages regardless of return as batting average is indicative that their "calls" are in the correct direction and/or it may be useful to select team members 138 that have both a high batting average and a high return as may be shown in chart 521 for providers in the upper right quadrant. Area 523 of window 420 is used by system 110 to deliver or present explanatory information regarding the performance information generated by the analytics module 114.

Using the interface screen 300 of FIG. 3, a user may select other performance data generated by the analytics module 114. For example, a user may select a methodology referred to at 328 as "comparing conviction of rating with return" which analyzes whether an analyst's use of a 3-point scale such as buy, hold, or sell or a 5-point scale that may add strong buy and strong sell to the 3-point scale makes a difference in returns obtained using their recommendations. Alternatively or in addition, a user may select at 330 an analysis referred to here as "independent research versus investment bank research" that compares the performance of independent research providers against the performance of affiliated providers such as investment banks that are covering the same stocks or stock sectors (e.g., does independence necessarily lead to better performance?). At 332, a user may choose a methodology that looks at the size of the research coverage universe versus a provider's returns to try to determine whether research providers that cover large numbers or small numbers of stocks perform better or if there is no discernable difference. At 334, a user may choose a performance analysis methodology 116 that involves comparing types of analysis, philosophy, and research methodologies used by various research providers to determine whether and how such choices may affect performance. Each of these subsets of performance information (and others not shown but considered within the breadth of the invention) may be provided to a user at a client node (or otherwise by delivering a hard or electronic version) at step 220 of process 200 to assist the user in picking the members 138 of a research team 136 that may complement each other to provide enhanced combined recommendations 146.

Referring again to FIG. 2, the method 200 continues at 230 with receiving from the client node 160 a user's selection of two or more individual research providers 138 to establish a research team 136. In some embodiments, this will be in response to the user interface screen 600 of FIG. 6 or a similar page, form, or interface being generated by GUI generation module 128 and displayed on node 160 as shown at 168 in FIG. 1. The screen or page 600 includes a window 620 that may be displayed when "My Research Teams" 316 is selected in the "Provider Selection" section 310. An area 624 is provided that lists previously formed teams at 626 and the team being created or modified (e.g., having its weighting or aggregation rules changed or adding or deleting members) at 628 (e.g., a text box where a default or custom name may be provided). As can be seen, a single user can create more than one team as shown in FIG. 1 at 136 and the teams may have the same members 138 with differing team rules 140 or may have different members 138 with the same or different rules (e.g., different rules may be used when the team is to be used to watch different sets of stocks 142 or for providing recommendations in differing market conditions or the like).

FIG. 6 shows a region or subwindow 630 to assist a user in building their team, and as shown, area 632 provides a list of five team members 138 that have been selected by a user at step 230 for inclusion on the team indicated or named at 628. If a user wants to provide additional members 138 (or, in some cases, delete members 138), they may move icon 350 to "Add Members" button 640, and at that point, a pull down or other listing of the available individual research providers is provided (or a user may type in or otherwise provide a name or identifier for an additional member). At step 240 of method 200, the system 110 provides a user of a client node 160 the default weighting provided to each team member and the user provides their settings for these weights (e.g., acceptance of the default settings and adjustments). In some embodiments, identical weights are applied to both positive and negative recommendations (e.g., if an advisor's recommendation or rating is given a weight of 25 percent this is used for both buy and sell type recommendations').

In other embodiments as shown in FIG. 6, a separate weight is applied to the positive and to the negative ratings or recommendations of each individual research provider (although, for some providers, the weights may be equal for each type of rating as chosen by a user/default values). As discussed with regard to the performance analysis of the providers' recommendations, it is often desirable to play to an analyst's strengths by weighting the type of recommendations they are better at providing more heavily than the recommendations that are not their strength, which may even be rated at zero such that a particular type of recommendation from that analyst is given no weight (i.e., is not considered as part of determining a team recommendation 146). Region 650 of window 620 includes settings indicative of rating weights for each member of the research team being defined by a user. A column of input boxes (e.g., pull down boxes or the like) is provided for positive recommendations 654 and for negative recommendations 658. In one embodiment, a default value for each member is to have an "average" weight that may be provided in percentages that add up to 100 percent (or weights from 0 to 100 with the total being 100 without any units) but, of course, numerous other weighting algorithms may be used to provide weighting to each team member's recommendations. For example, with 5 team members as shown on a team, the default weighting would be 20 percent for both positive and negative recommendations or ratings for a stock. If the user provides no modifications or inputs, the team members' votes or ratings would all be treated equally (e.g., each receive "1" vote). However, more typically, the weights are selected to emphasize the strengths of the analysts as identified by the analyzed performance at step 220. For example, one of the research providers is shown in columns 654, 658 to have equal weighting for each of their recommendations but at 25 percent because one provider is not allowed to provide input or is not considered for positive recommendations. Likewise, two analysts are weighted as zero for negative recommendations as they may have a history of not accurately picking such ratings based on a particular performance metric, but they are included in the team to have their positive recommendations considered in the team recommendation. Further, one member is only included for their negative recommendations and another is included for both recommendations with their negative recommendations weighted more heavily (e.g., they are better at predicting sells but are also relatively good at buys). The combinations of the weightings are nearly infinite with the specific weights shown only being provided as one example and not as a limitation.

At 250, the user of the client node inputs a selection of the team rules 140 that are received at the analyst system 110 and used during validation/testing and during se of the team to determine the team recommendations 146. Referring to FIG. 6, a team rule entry area 660 is provided with a text or pulldown box 666 in which a user can view any default team rules and select from a list of available rules for aggregating the recommendations of the team members. The team manager module helps a user construct a research team to emphasize an individual provider's strength within the team, such as over-weight their buys or sell recommendations. A research team is built by choosing weightings, rules and coverage preferences. The system then generates a history of buy, sell and hold recommendations for that team. The team can be plotted on the scatter plot, and analyzed against peers, by portfolio, by industry, sector or security.

Applying team rules in one embodiment involves selection among five rule categories including: average, majority, consensus, unanimous to buy and one to sell, and unanimous to sell and one to buy. For average, the average of the individual provider's ratings is calculated in order to create a team recommendation. The positive and negative weights of the individual team member ratings are applied and the average rating is calculated. For majority, at least half of the team members supplying a rating must agree in order to create a team recommendation. The positive and negative weights of the individual team member ratings are applied and the majority rating is calculated. For consensus, all team members supplying a rating must agree in order to create a team recommendation (i.e., weights do not apply). For unanimous to buy and one to sell, all team members supplying a rating must agree to a buy for a team recommendation of buy, but if one team member goes to sell, then the team recommendation prompts a sell (i.e., weights do not apply). Weights are taken into account for the average and majority rules only. Rating weights do not need to be set for unanimous to buy, one to sell or consensus. The total for positive or negative weightings is based on the analyst's preference and while the dialog box has values from 1-100, any positive integer is valid and numbers greater than 100 are also valid. For example an analyst gives 2× the weight of a single provider, effectively doubling their rating within the aggregate score. Additional areas an analyst can define in order to produce a research team include: opinion required and coverage required. For opinion required, the provider is required to have an opinion in order for there to be a team rating. For rating coverage, in order for a team rating to be generated at least X of Y team members must cover the stock for a team to form an opinion. This defaults to a minimum of one team member.

Other team rules may be used that do not use the weights. For example, a user may decide to have the team recommendation determined by a majority of the team members. When this team rule or recommendation aggregation rule is applied, more than half of the members must agree to either buy or sell (or make a positive or negative recommendation) before such a rating or recommendation is generated for the team. Use of this rule may tend to encourage the inclusion of an odd number of team members such as 3, 5, 7, or more team members to avoid ties but this is not a requirement. The user may at 250 also decide to use a "consensus" rule in which all must agree to buy or sell (or provide a positive or negative) recommendation with just one dissenter being allowed to block the recommendations of all the other members. Further, a user may select in box 666 to have the team rule require that a positive or buy recommendation requires unanimity while only one negative or sell recommendation may be required to make a negative or sell recommendation from the team. With the above discussion understood, other recommendation combination rules will be apparent to those skilled in the art and are considered within the breath of the concept of applying a team rule to combine the team members' recommendations with or without weighting being applied.

Further rules or team settings may be provided such as by selection of a box 634 to indicate that a team recommendation cannot be generated if one or more selected team members does not follow a stock or otherwise has not provided a recommendation (e.g., certain team members may be considered critical to achieving an accurate team recommendation). Similarly, a setting at 670 may be entered by a user to require a particular number of the team to follow a stock before the team can generate a recommendation, and when that number of recommendations from the team members is not present the team will not issue a recommendation or issue a statement or report indicating there the stock is not followed (e.g., "no recommendation available" or "this stock is not followed by a required quorum of the team" or the like). Once the members are selected and rules and weights set the team can at least temporarily be saved in memory 130 by selecting button 680.

The method 200 continues at 260 with validating or testing the research team 136 defined by the user based on a default set of securities (e.g., all securities, a particular subset of securities, or the like) or a user-provided subset of securities (e.g., the set of securities 142 defined by the user as ones they wish to track or have coverage such as those in their fund or considered for addition to their portfolio). The testing or validation also is performed over a default time period such as the past year, past two years, past three to five years, or the like or a time period selected by the user (e.g., a time period corresponding with a particular market trend such as a bull market or bear market or a particular economic environment). The testing or validation may also be performed based on a default or user-selected methodology 116 such as batting average, outperforming peers, or the like as discussed above with regard to determining performance of analysts at step 220 with performance analytics module 114. In a testing or validation step 260, the analytics module 114 uses the team weights and team aggregation rules compared to historic market data 156 to determine how the research team would have performed based on their actual, historic recommendations, which are also available in the market/historic data 156 (or in a separate database that stores the research of the providers or analysts). For example, the performance of the research team is determined for investing in a set of stocks over a particular time period using team recommendations 146 created by retrieving prior recommendations of the team members 138 for the stocks and generating team recommendations 146 using the team rules including weighting and aggregation rules.

Figure 7:
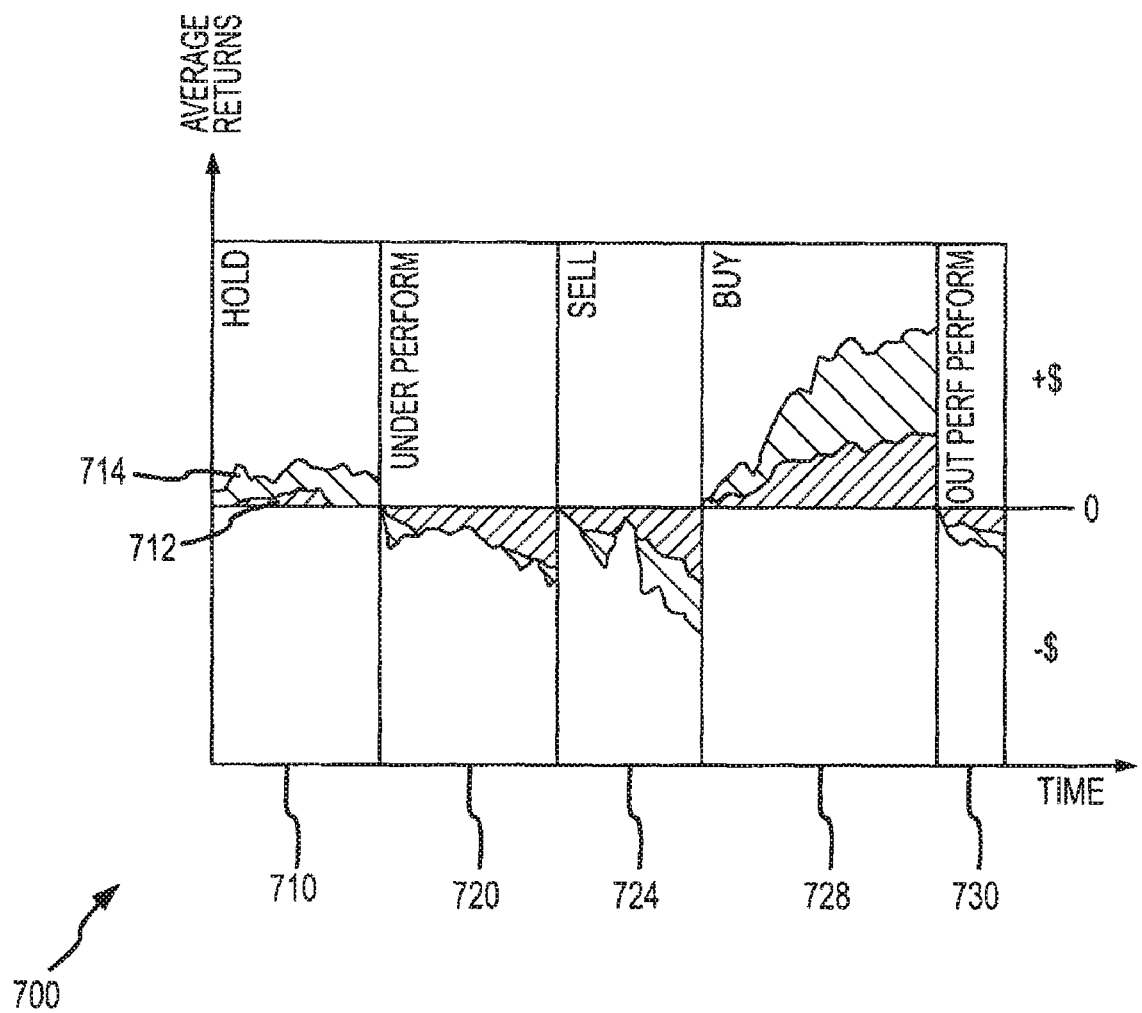
FIG. 7 is a graph illustrating the alpha or differential obtained by use of an exemplary research team as a Virtual securities analyst based on their 5-point recommendations over a representative time period.

At 270, the team's performance and/or recommendations are reported to a user by generating a report or displaying a chart or graph on the client node 160. Such reports or charts may provide the team's performance or ranking relative to the individual team members, to all available research providers, and/or to market benchmarks. For example, the system 110 may generate at 270 an alpha chart 700 as shown in FIG. 7 that can be provided to the client node 160. As discussed earlier, alpha is a measure of a differential between the team's performance and a benchmark such as a market index. As shown, the alpha chart 700 includes a hold portion 710 in which the research team was able to provide alpha, alpha return, or, simply, differential return 714 over the index return 712 as measured with average returns over time using a 5-point rating or recommendation scale. Similarly, in underperform and sell portions 720, 724 (e.g., negative recommendations), the performance information indicates the team was able to outperform the market index or provide an alpha. Likewise, during positive recommendations of buy and outperform 728, 730, the research team's recommendations led to increased returns or an alpha compared to the market index or benchmark. FIG. 8 shows a research team report 800 with a return or performance chart 820 that shows the research team 822 has outperformed (or provided an alpha) over the individual research providers 826, which in this example were the individual members of the team (as shown in the team member overview provided in the left hand portion of the report). As shown in this test of the formed research team, the team's recommendations led to better returns in the prior 1 and 5 year periods than any of the individual members of the team and also provided a better batting average for both buys and sells.

The method 200 continues at 274 with a determination of whether the user wishes to modify the team or pick a new team. If so, the method 200 returns to 230 (or to 220). If the research team had produced significant out performance as shown in chart 700 as shown in FIG. 7 and a report 700 as shown in FIG. 8, the user may decide not to change the team or its rules, but the user may wish to build another team to try to achieve better performance than that achieved with the existing research teams or a team that is able to achieve an alpha in particular market or financial environments or in a particular stock sector or the like. In other cases, the user may attempt to slightly modify the rules such as weighting to try to improve the performance of the research team. The method 200 also may continue at 276 with a determination of whether to retest the team, which may be useful to check if the team performs better over differing time periods (e.g., over differing economic trends, markets, and the like) or to apply a differing performance methodology to validate or test the research team using historic market data and historic recommendations of the team members. At 278, the user can select to change the rules of the team, too, prior to retesting which returns control to step 240 or can retest at 260 such as by changing the time period for validation. The method 200 then ends at 290.

Use of the formed team is not shown in the method 200 of FIG. 2, but it will be understood that once a research team is formed that it may be used prospectively to make investment decisions. For example, research from team members may be ordered and processed as a stock screener to determine when to add new investments to a portfolio or fund. In other cases, the research team, its data or research including stock recommendations, and the team rules may be processed by system 110 or other modules/systems to track a set of securities 142 and determine when stocks should be bought, held, and sold based on the teams current recommendations 146 for each of these stocks. Further, alerts may be issued when there is change to one of the members recommendations a call, an upgrade, a downgrade, or the like that effects the team recommendations. Further, with reference to the method 200, the user may have the option of manually selecting the team members such as after reviewing the team members' historic performances as discussed above or the user may choose to have their members chosen based on input criteria. For example, a user may choose to add a team member with a particular ranking when a performance methodology is considered, e.g., select the highest ranked predictor of sells, the highest ranked batting average analyst, the highest ranked momentum analyst, and the like. Further, in some embodiments, the "default" weights may be chosen by the system 110 based on the determined performance of each of the team members relative to the other members (e.g., an automated weighting to highlight the strengths and weaknesses of the team members) such as by using proportions based on the rankings or returns of the team relative to the other members or the like.

FIG. 9 illustrates a system flow diagram 900 illustrating operation of a system according to the invention for team selection, management, and use such as may be achieved with system 100. As shown, a user or client node operated by a user 904 interfaces with a system such as by inputting data and viewing reports or outputs of the system. The system includes a research provider selection module 910 in which a universe of available symbols or stocks of companies is defined and may include the stocks of a particular stock exchange(s) or be a larger set or a subset of such stocks (e.g., essentially filtering providers by interest list or holdings). At 914, the module 910 may allow a user to apply one or more filters to the universe of symbols and at 918 a dataset of the filtered subset of symbols is generated, and this allows the user 904 to select a set of securities or stocks for coverage by a research team and for use in evaluating performance of individual research providers.

The system includes a research team manager module 930 that the user 904 uses at 932 to choose a collection of individual research providers to draft a research team, and, as discussed with regard to FIG. 2, the members are often selected based on their historic performance or rankings. Each of the drafted teams and their team members are stored in memory at 933. At 934, the system functions to allow the user 904 to create a recommendation rule or team rule for defining how the recommendations of each of the team members will be processed on each of the teams to allow a team recommendation to be generated, and the rules are stored in memory at 935. At 936 a script of the team rule may be generated and then compiled at 938 for later application to recommendation information for the team members. The research team manager 930 is shown at 940, 942, and 944 to act to determine from analytics data rating or recommendation history 944 recommendations of both the individual research providers and the research team on which they are members at 942 with team recommendations being determined at 940 using rules 938. At 946, the research team manager 930 may act to determine new or updated recommendations of an individual research provider on one of the teams 933, which may be provided by continuous updates or change detection at 948 in the research provider reports/data (e.g., processing of inbound data feeds from a data acquisition group or DAG and/or a document management architecture or DMA) that triggers at 949 an update signal or alert.

The system further includes a performance analytics engine 960 that may be requested at 950 by the research team manager 930 to recalculate team and/or individual research provider performance or rankings. To this end, the engine 960 may periodically such as once a day obtain at 962 analyst data including recommendations and at 964 the closing price of stocks, such as those in the dataset defined at 918 and/or that are associated with research provider recommendations. At 966, stocks that are being tracked have their prices update and the analytics database is updated at 968 to reflect performance details based on the providers' ratings or recommendations. At 970, it is indicated that the engine 960 may be rerun periodically such as once per day or in response to a query 950. At 974, the engine 960 functions to update recommendation or rating history tables and performance based on a particular analysis methodology and this information is stored in memory at 978.

In some cases, the methodology employed by the engine 960 to determine team and individual research provider performance is a total return-based methodology (including, in some cases, dividend reinvestment) that provides meaningful return experiences for direct comparison to other investments, providers, and benchmarks. The methodology determines out-performance or under-performance for all recommendations or ratings from buy, sell, and hold periods (e.g., see the alpha chart of FIG. 7). When combined with scoring or other techniques, this methodology can provide relative performance comparisons to determine impact of rating conviction for analysts that provide 5-point rating scales as well as other scales such as 3-point rating scales.

FIG. 10 provides another data flow diagram 1000 that illustrates data flow during operation of a system according to the invention (such as system 100 of FIG. 1). As shown, a script engine 1020 provides input data/messages to a methodology data calculation module 1040 (e.g., analytics engine 960 of FIG. 9 or performance analytics module 114 of FIG. 1 or the like) and rules module 1030. The messages or information required by module 1040 may be provided by market information and/or research provider reports or database 1010 and from input from a user via their Web or other node 1014. The messages/information includes pricing updates 1022 regarding monitored stocks (e.g., 5000 or more stocks or a subset of the stock symbol universe). Recommendation updates 1024 are also tracked and when an analyst makes a call such as an upgrade or a downgrade this information is retrieved by the engine 1020 and passed to the module 1040 for updating performance information.

A user may create and update teams with communications 1028 that are passed by script engine 1020 from the Web browser or client node 1014 to the research team module 1060 via rules module 1030 that is used to update and track team rules such as weighting and aggregation algorithms for generating team recommendations and via calculation module 1040 that uses the teams and its rules to determine team performance and its recommendations. Research provider module 1050 is used to provide a listing of available research providers (e.g., from one to 200 or more and in some cases to provide research provider reports which may also be provided by module 1010. A user may request at 1026 that the data be rolled up or combined to generate performance reports that compare the performance of a generated research team with its individual members and to report on the team's recommendations and ability to generate alpha over time. The information that is output to the user from the calculation module 1040 may be considered a wrapped library of data 1080 from the research team 1080 that is stored in memory.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. For example, the method 200 and flow shown in FIGS. 9 and 10 are not intended to indicate a mandatory order of steps or processing, and many of the functions of the invention may be performed in any order and/or may be repeated as useful to better select, validate/test, and use research teams made up of individual research providers or analysts. Prior to the invention described herein, there was no analytics tool or process that generated teams of research providers whose recommendations were processed according to customizable weighting and/or rules to generate improved investment recommendations (e.g., buy, hold, sell, and similar recommendations), which generate significant alpha relative to benchmarks when they are implemented by a money or asset manager or other investor in securities. Prior technology was useful for generating performance data on individual research providers based on historical financial data such as prior recommendations for stocks and the stocks' performances after such recommendations. For example, the prior performance analysis technology may have been used to determine a research analyst's such as an investment bank's batting average (i.e., consistency), return (i.e., performance), and the like, but the inventive methods and systems described in this document were the first to roll up performance to allow a user or customer to create a research team and then apply rules such as weighting algorithms and aggregation rules to generate recommendations that clearly perform better than recommendations of the individual team members and often better than accepted market performance benchmarks.

The invention claimed is:

1. A method for forming a team of individual research providers to generate stock recommendations, comprising:
running a user interface on a client node linked to a network;
displaying performance information based on analysis of prior stock investment recommendations for a plurality of research providers in the user interface;
receiving a selection of a set of the research providers for a research team;
generating team rules for combining stock investment recommendations from the set of research providers on the research team into team investment recommendations;
running an analytic module on a server to determine investment performance for the research team for a period of time based on the team investment recommendations for the period of time for a set of stocks; and
reporting the investment performance to the client node along with individual performance information for the period of time for the set of research providers on the research team.

2. The method of claim 1, further operating the analytic module to determine the performance information for the plurality of research providers based on a user-selected performance analysis methodology.

3. The method of claim 1, wherein the team investment recommendations for the set of stocks comprise positive, neutral, or negative recommendations and the team rules comprise aggregation rules for combining the positive, neutral, or negative recommendations of the set of research providers on the research team.

4. The method of claim 3, wherein the team rules generating comprises receiving from the client node weights to apply to each positive recommendation and each negative recommendation of each of the research providers on the research team and wherein the aggregation rules comprise combining the recommendations after applying the weights.

5. The method of claim 1, wherein team rules are selected from the group of methods for combining team member recommendations consisting of an averaging methodology, a majority methodology, a consensus methodology, and a unanimous-to-buy-one-to-sell methodology.

6. A method for forming a team of individual research providers to generate stock recommendations, comprising:
   receiving a selection of a set of research providers for a research team;
   generating team rules for combining stock investment recommendations from the set of research providers on the research team into team investment recommendations;
   running an analytic module on a server to determine investment performance for the research team based for a period of time based on the team investment recommendations for the period of time for a set of stocks; and
   reporting the investment performance to a client node along with individual performance information for the period of time for the set of research providers on the research team,
   wherein the team investment recommendations for the set of stocks comprise positive, neutral, or negative recommendations and the team rules comprise aggregation rules for combining the positive, neutral, or negative recommendations of the set of research providers on the research team.

7. The method of claim 6, further comprising prior to the receiving of the selection of the set of the research providers:
   running a user interface on the client node linked to a network; and
   displaying performance information based on analysis of prior stock investment recommendations for a plurality of research providers in the user interface.

8. The method of claim 6, further operating the analytic module to determine the performance information for the plurality of research providers based on a user-selected performance analysis methodology.

9. The method of claim 6, wherein the team rules generating comprises receiving from the client node weights to apply to each positive recommendation and each negative recommendation of each of the research providers on the research team and wherein the aggregation rules comprise combining the recommendations after applying the weights.

10. The method of claim 6, wherein team rules are selected from the group of methods for combining team member recommendations consisting of an averaging methodology, a majority methodology, a consensus methodology, and a unanimous-to-buy-one-to-sell methodology.

11. A method for forming a team of individual research providers to generate stock recommendations, comprising:
   running a user interface on a client node linked to a network;
   displaying performance information based on analysis of prior stock investment recommendations for a plurality of research providers in the user interface;
   receiving a selection of a set of the research providers for a research team;
   generating team rules for combining stock investment recommendations from the set of research providers on the research team into team investment recommendations; and
   running an analytic module on a server to determine investment performance for the research team based for a period of time based on the team investment recommendations for the period of time for a set of stocks.

12. The method of claim 11, further including reporting the investment performance to the client node along with individual performance information for the period of time for the set of research providers on the research team.

13. The method of claim 11, further operating the analytic module to determine the performance information for the plurality of research providers based on a user-selected performance analysis methodology.

14. The method of claim 11, wherein the team investment recommendations for the set of stocks comprise positive, neutral, or negative recommendations and the team rules comprise aggregation rules for combining the positive, neutral, or negative recommendations of the set of research providers on the research team.

15. The method of claim 14, wherein the team rules generating comprises receiving from the client node weights to apply to each positive recommendation and each negative recommendation of each of the research providers on the research team and wherein the aggregation rules comprise combining the recommendations after applying the weights.

16. The method of claim 11, wherein team rules are selected from the group of methods for combining team member recommendations consisting of an averaging methodology, a majority methodology, a consensus methodology, and a unanimous-to-buy-one-to-sell methodology.

17. A system for providing a virtual security analyst providing a single investment recommendation for each security in a set of securities based on recommendations of a set of research providers, comprising:
   means for enabling a user to specify two or more of the research providers to include on a research team;
   means for enabling a user to specify a set of rules for combining positive and negative recommendations for securities generated by the research providers on the research team;
   means for determining for a set of securities historic performance of individual ones of the research providers on the research team and of the research team based on the set of rules and prior positive and negative recommendations of the research providers; and
   means for reporting the historic performances to a user.

18. The system of claim 17, wherein the set of rules includes separate weight values assigned to negative recommendations and to positive recommendations for each of the research providers on the research team.

19. The system of claim 17, means for enabling a user to define a plurality of securities for coverage by the research team, means for determining positive and negative recommendations of the research providers on the research team for the plurality of securities, means for generating team recommendations by processing the determined positive and negative recommendations using the set of rules, and means for reporting the team recommendations.

20. The system of claim 19, means for generating updated team recommendations in response to modifications of one or more of the determined positive and negative recommendations and means for alerting a user to the generated updated team recommendations.

21. The system of claim 17, wherein the historic performances reported to the user exclude the prior positive and negative recommendations of the research providers, whereby the research team is validated without release of recommendation information of the research providers on the research team.

* * * * *